United States Patent
Haselhorst et al.

(10) Patent No.: US 10,081,044 B2
(45) Date of Patent: Sep. 25, 2018

(54) METHOD FOR PRODUCING A CHASSIS LINK

(71) Applicant: Autotech Engineering Deutschland GmbH, Bielefeld (DE)

(72) Inventors: Kai Haselhorst, Versmold (DE); Viktor Friesen, Bielefeld (DE); Denis Geßner, Bielefeld (DE); Carsten Dejok, Gütersloh (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 371 days.

(21) Appl. No.: 14/676,194

(22) Filed: Apr. 1, 2015

(65) Prior Publication Data
US 2015/0283595 A1  Oct. 8, 2015

(30) Foreign Application Priority Data
Apr. 2, 2014  (EP) ..................................... 14163205

(51) Int. Cl.
*B21D 22/26* (2006.01)
*B21D 28/00* (2006.01)
(Continued)

(52) U.S. Cl.
CPC ............ *B21D 22/26* (2013.01); *B21D 28/00* (2013.01); *B21D 53/88* (2013.01); *B60G 7/001* (2013.01); *B60G 2204/1431* (2013.01); *B60G 2206/017* (2013.01); *B60G 2206/10* (2013.01); *B60G 2206/12* (2013.01); *B60G 2206/122* (2013.01); *B60G 2206/16* (2013.01);
(Continued)

(58) Field of Classification Search
CPC ........ B60G 2206/122; B60G 2206/811; B60G 2206/141; B60G 2206/8104
See application file for complete search history.

(56) References Cited

U.S. PATENT DOCUMENTS 5,662,349 A   9/1997  Hasshi et al.
5,845,938 A   12/1998 Kato
(Continued)

FOREIGN PATENT DOCUMENTS

CN    201856593 U   6/2011
CN    102555714 B   9/2014
(Continued)

OTHER PUBLICATIONS

WO 2005/072998 Translation from Espacenet, Ferrera, etc, Aug. 11, 2005. Retrivied from the Internet Jan. 12, 2017 https://worldwide.espacenet.com/publicationDetails/biblio?DB=EPODOC&II=3&ND=3&adjacent=true&locale=en_EP&FT=D&date=20050811&CC=WO&NR=2005072998A1&KC=A1#.*

*Primary Examiner* — Michael N Orlando
*Assistant Examiner* — Marta S Dulko
(74) *Attorney, Agent, or Firm* — The Webb Law Firm (57) ABSTRACT

A method for producing a chassis link includes shaping a single-shell main body from a sheet metal blank and deforming the sheet metal blank by deep drawing, which includes pre-drawing during which an indentation is produced on the main body and in which the indentation is trimmed and a bush is attached to a projection on the main body once the indentation has been trimmed. The sheet metal blank is pre-drawn such that the indentation is given a radius that matches the bush to be attached such that there is no further need for a further forming operation on the indentation once the indentation has been trimmed.

15 Claims, 7 Drawing Sheets

(51) Int. Cl.
    *B21D 53/88*    (2006.01)
    *B60G 7/00*    (2006.01)
(52) U.S. Cl.
    CPC .. *B60G 2206/722* (2013.01); *B60G 2206/811*
        (2013.01); *B60G 2206/8104* (2013.01); *B60G*
            *2206/8201* (2013.01); *Y10T 29/49872*
            (2015.01); *Y10T 156/1002* (2015.01)

(56)            References Cited

U.S. PATENT DOCUMENTS

| 2011/0115186 A1* | 5/2011 | Chiku ................... B60G 7/001 |
| | | 280/124.134 |
| 2011/0127743 A1* | 6/2011 | Musha ................... B23K 31/00 |
| | | 280/124.1 |
| 2012/0038126 A1 | 2/2012 | Monchiero et al. |
| 2014/0062050 A1 | 3/2014 | Williams et al. |

FOREIGN PATENT DOCUMENTS

| DE | 102007018569 A1 | 10/2008 | |
| DE | 102011010367 A1 | 8/2012 | |
| EP | 0794075 A2 | 9/1997 | |
| EP | 2295269 A1 | 3/2011 | |
| FR | 2864514 A1 | 7/2005 | |
| GB | 2291382 A | 1/1996 | |
| WO | WO 2005072998 A1 * | 8/2005 | ............ B60G 7/001 |
| WO | 2010004414 A2 | 1/2010 | |
| WO | 2010089705 A1 | 8/2010 | |

\* cited by examiner

METHOD FOR PRODUCING A CHASSIS LINK

CROSS-REFERENCE TO RELATED APPLICATION

This application claims priority to European Patent Application No. 14163205.9 filed Apr. 2, 2014, the disclosure of which is hereby incorporated in its entirety by reference.

BACKGROUND OF THE INVENTION

Field of the Invention

The invention relates to a method for producing a chassis link, in particular a transverse control arm, which includes a single-shell main body shaped from a sheet metal blank, on which main body bearing regions are formed for attaching bearing elements by which the main body can be connected to a bodywork part or crossmember and to a movable part of a wheel suspension of a motor vehicle. The bearing regions include a wheel-side bearing region and two bodywork-side or crossmember-side bearing regions. The main body includes two arms which merge into one another and define a main-body plane and a concave edge region of the main body. The concave edge region extends from the wheel-side bearing region up to a first of the two bodywork-side or crossmember-side bearing regions and may be at an angle relative to the main-body plane. The second bodywork-side or crossmember-side bearing region may be in the form of a projection and may be provided with a bush. The projection and the arm, which includes the first bodywork-side or crossmember-side bearing region, define an indentation, along which the main body is angled relative to the main-body plane.

Description of Related Art

Chassis links which form an attachment member between the bodywork or a crossmember of a motor vehicle and a dynamically movable part of a wheel suspension, in particular a wheel carrier, are known in various designs. They can be formed as cast components or as sheet steel shells. Besides the inherent stiffness and wear resistance of a chassis link of this type, the weight thereof is also crucial, because the vehicle weight and thus the fuel consumption can be reduced by means of a lightweight component having high inherent stiffness.

DE 10 2007 018 569 A1 discloses a substantially L-shaped chassis link (transverse control arm), which is formed as a single shell, a bearing pin for attaching a bush-shaped bearing element being arranged on the end of one of the two sheet metal arms of said link. The sheet metal arm has a U-shaped cross-sectional profile and tapers off into a socket which encloses the bearing pin with a wrapping angle of at least 270° and is integrally bonded to the pin. A further bearing region of the chassis link has a bush which is welded to a projection which has a U-shaped cross section and is formed at the transition point between the arms which merge into one another. The chassis link is shaped from a sheet metal blank in several operations, in particular by deep drawing, trimming edge portions of the pre-drawn blank, and bending trimmed edge portions. Although a chassis link of this type can be produced cost-effectively owing to the single-shell sheet metal design, it has been found that bending (bending down) a trimmed edge portion causes high stresses in the region of the projection used for attaching the bush, and these stresses can lead to cracking in said region.

SUMMARY OF THE INVENTION

On this basis, an object of the invention is to provide a method for producing a chassis link of the type mentioned at the outset, which eliminates the risk of cracking as a result of either critical levels of deformation or excessive edge stresses during the forming operation and which is also cost-effective.

In the method according to the invention, the sheet metal blank is likewise deformed by deep drawing, the deep drawing including pre-drawing, in which the indentation in the projection used for attaching the bush is produced. This indentation, also known as a box corner, is trimmed. Once the indentation has been trimmed, the bush is attached to the projection. According to the invention, the sheet metal blank is pre-drawn such that the indentation is given a radius that matches the bush to be attached, and therefore no further forming operation is required in the indentation once the indentation has been trimmed. Unlike in the prior art, according to the invention no further deformation takes place in the indentation. This prevents critical levels of deformation and/or critical edge stresses which can lead to cracking.

In other words, in the method according to the invention, the sheet metal blank is pre-drawn such that the indentation, along which the main body of the chassis link is angled relative to the main-body plane, is produced having an edge region which, when viewed in cross section, has an outwardly curved edge end region which defines an radius and merges into a leg which has a recess for receiving the bush to be attached. The size of the radius is for example in the range of from 1.5 mm to 12 mm, preferably in the range from 2 mm to 5 mm.

In the method according to the invention, the indentation (box corner) is preferably trimmed from above, i.e. by means of a cutting tool that acts on the pre-drawn sheet metal blank so as to cut from above, an edge region to be cut off from the indentation being lower than the main-body plane.

A further preferred embodiment of the method according to the invention provides that the projection is formed, as a result of the pre-drawing of the sheet metal blank, so as to have a substantially U-shaped cross-sectional profile. This bearing region of the chassis link is thus provided with high inherent stiffness. In addition, the projection thus formed provides a relatively large connection region for integrally bonding the bush. For this purpose, both legs of the U-shaped cross-sectional profile are preferably welded to the bush.

According to another preferred embodiment of the invention, the projection can also be formed, as a result of the pre-drawing of the sheet metal blank, so as to be angled relative to the main-body plane of the chassis link, a bearing eyelet for receiving the bush being produced beforehand or subsequently in a portion of the sheet metal blank that forms part of the projection in the finished chassis link. In this embodiment, a relatively low degree of deformation is required to produce the projection. The edge stresses occurring on the projection are accordingly low. To attach the bush to the projection, the bush is preferably pressed into the bearing eyelet. To obtain a particularly reliable bush attachment, the bearing eyelet is provided with a passage (collar) before the bush is pressed in. The passage increases the attachment surface and secures the bush to prevent tipping with respect to the sheet metal shell. According to an alternative or additional embodiment of the method, the bush can be welded to the bearing eyelet once received therein.

Another advantageous embodiment of the method according to the invention is characterised in that the sheet metal blank is shaped during deep drawing such that the angled, concave edge region of the chassis link comprises, along at least one curve length portion, at least one oblique surface which, when viewed in cross section, encloses an angle in the range of from 25° to 75° with a surface, adjacent thereto, of the angled, concave edge region. As a result, the inherent stiffness, in particular the permissible buckling load, of the chassis link is increased for a specified or maintained thickness and/or at a constant component weight. In addition, this results in stresses being distributed in the link in a more uniform manner during operation of the vehicle. Furthermore, this embodiment allows for a reduction in the stresses that occur in the angled, concave edge region of the chassis link as a result of the deformation and an improvement thereby in the wear-resistance of the chassis link.

The oblique surface which is preferably formed on the angled, concave edge region of the main body corresponds to or is similar to a chamfer and can be formed along the entire curve length of the angled, concave edge region of the main body. However, to increase the component stiffness, in particular the buckling load, and/or to distribute stresses in the main body in a more uniform manner, it may also be sufficient, according to an embodiment of the method according to the invention that is advantageous in production terms, for the oblique surface (chamfer) to only extend over a partial length of the curve length of the angled, concave edge region, for example over less than 80%, in particular less than 60%, of said curve length. In particular, an embodiment of the method according to the invention provides that the curve length portion over which the oblique surface extends is at least 10%, preferably at least 20%, of the curve length of the angled, concave edge region.

Another advantageous embodiment of the method according to the invention is characterised in that the sheet metal blank is shaped during deep drawing such that the angle enclosed by the oblique surface and a surface, adjacent thereto, of the angled, concave edge region varies along the curve length portion, the variation being at least 5°, preferably at least 10°. This can also further increase the component stiffness, in particular the permissible buckling load. Furthermore, as a result of this embodiment, the distribution of stresses in the main body of the chassis link during operation of the vehicle can be made even more uniform or further optimised.

Internal tests have shown that the component stiffness or the buckling load, which can be supported, of the chassis link is significantly increased in particular when, according to another preferred embodiment of the invention, the sheet metal blank is shaped during deep drawing such that the oblique surface, when viewed in cross section, on the angled, concave edge region has a length in the range of from 5 mm to 20 mm.

It has also been found that the component stiffness, the buckling load, which can be supported, of the chassis link and/or the distribution of stresses can be further optimised if, according to a preferred embodiment of the invention, the sheet metal blank is shaped during deep drawing such that, on the angled, concave edge region, the length of the oblique surface varies along the curve length portion, the variation being at least 1 mm, in particular at least 2 mm.

An embodiment of the method according to the invention, in which the sheet metal blank is shaped during deep drawing such that the curve length portion having the oblique surface crosses the region of the main body in which the two arms merge into one another, is also advantageous. This embodiment is particularly effective in terms of both the desired increase in the component stiffness and more uniform distribution of stresses.

To obtain as low a weight as possible yet with high component stiffness, the sheet of the main body of the chassis link should have a thickness in the range of from 2 mm to 6 mm and a tensile strength in the range of from 350 MPa to 1200 MPa. Preferably, a sheet metal blank made of dual-phase steel is used to produce the main body. Complex phase steels or thermomechanically rolled, cold-formed steels are also well suited for producing the chassis link according to the invention if relatively high strengths or component stiffnesses are desired.

BRIEF DESCRIPTION OF THE DRAWINGS

The invention will be described in more detail below on the basis of drawings which show a number of embodiments and in which.

DETAILED DESCRIPTION OF THE INVENTION

The chassis link (transverse control arm) 1 shown in the drawings includes a main body 2 which has a substantially L-shaped or triangular design. Said link is formed as a front axle transverse control arm for a motor vehicle, in particular a passenger car. The main body 2 of the chassis link 1 is designed as a single-shell (single-piece) sheet metal moulded part and is shaped from a sheet metal blank to form the shell, in particular by deep drawing. The main body 2 comprises two arms 2.1, 2.2 which merge into one another and define a main-body plane 3 and a concave edge region 4.

Bearing regions 5.1, 5.2, 5.3 for attaching bearing elements are formed on the main body 2. The bearing regions 5.2 and 5.3 are bodywork-side or crossmember-side bearing regions. The bearing region 5.2 is formed as a projection 5.21 and provided with a bush 6, for example in the form of a flange sleeve. The bush 6 is welded to the projection 5.21 and receives a rubber-coated bearing bush 6.1. The rubber casing 6.2 of the bearing bush 6.1 is pressed, glued or injected into the bush 6.

The projection 5.21 and the arm 2.2, which has the bearing region 5.3 on its end, define an indentation 12 or what is known as a box corner, along which the main body 2 is angled relative to the main-body plane 3.

The forming of the sheet metal blank includes pre-drawing. The sheet metal blank is pre-drawn such that the radius R3 in the indentation (corner box) 12 matches the bush 6 to be attached later. The indentation 12 is trimmed. Trimming takes place from above. Since the radius R3 in the indentation 12 already matches the bush 6 to be attached, there is no need for further deformation in the indentation 12. Therefore, no further forming operation takes place in the indentation 12. The projection 5.21 (bearing region 5.2) is formed, as a result of the pre-drawing of the sheet metal blank, so as to have a substantially U-shaped cross-sectional profile. The two legs (flanks) 16, 17 of the U-shaped cross-sectional profile are oriented so as to be substantially straight with respect to the bush 6 as a result of the pre-drawing of the sheet metal blank. Preferably prior to forming (pre-drawing), concave or circular-segment-shaped recesses 18, 19 are cut out of the edge region of the sheet metal blank that defines the projection 5.21 or is deformed to form the projection 5.21 (cf. FIG. 2).

Figure 1:
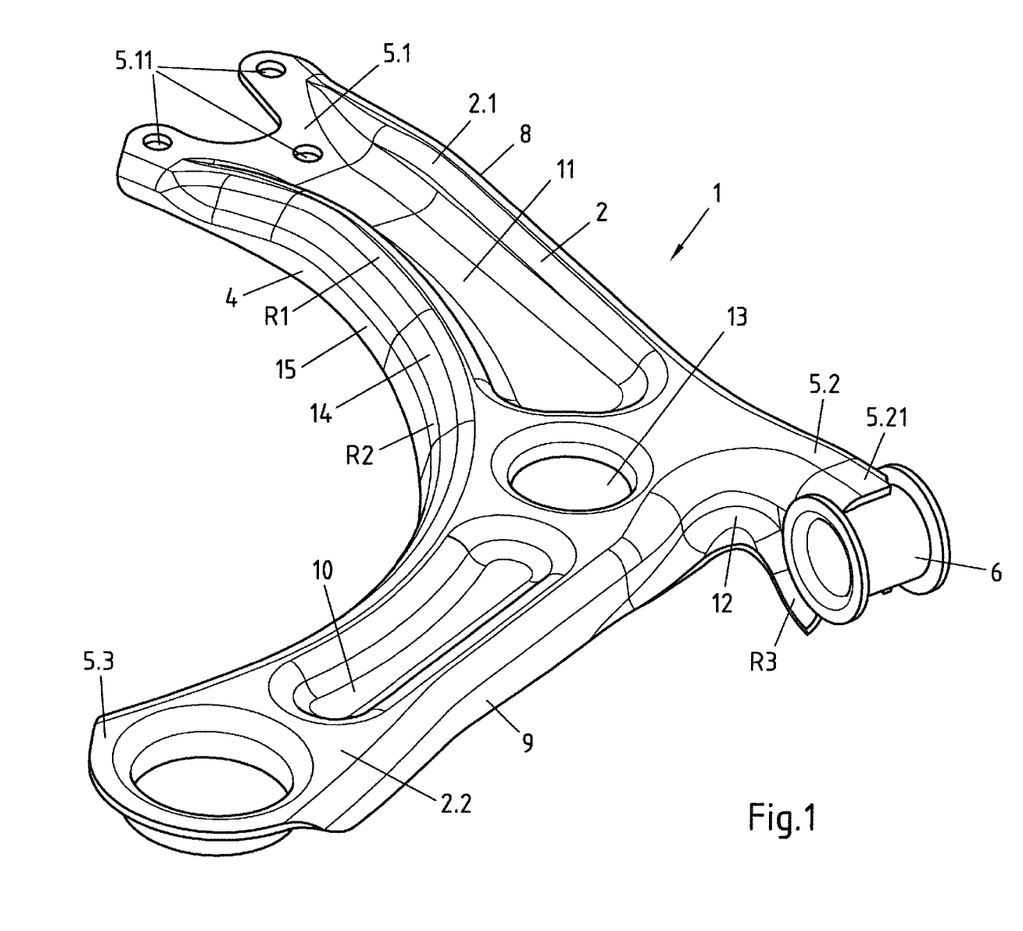
FIG. 1 is a perspective view of a single-shell chassis link shaped from sheet metal and having a bush attached thereto.
Figure 2:
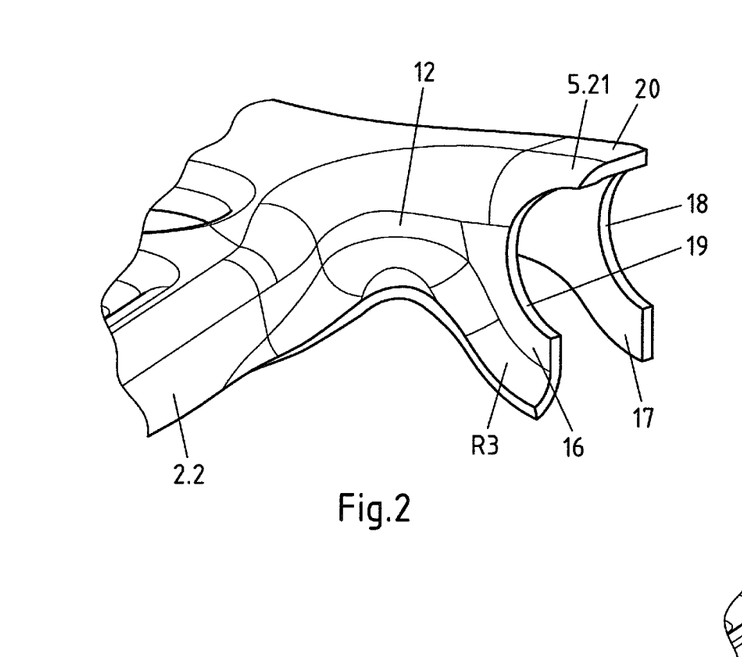
FIG. 2 and FIG. 3 are slightly enlarged perspective views of a portion of the chassis link of FIG. 1 without the bush and comprising the bush, respectively.
Figure 3:
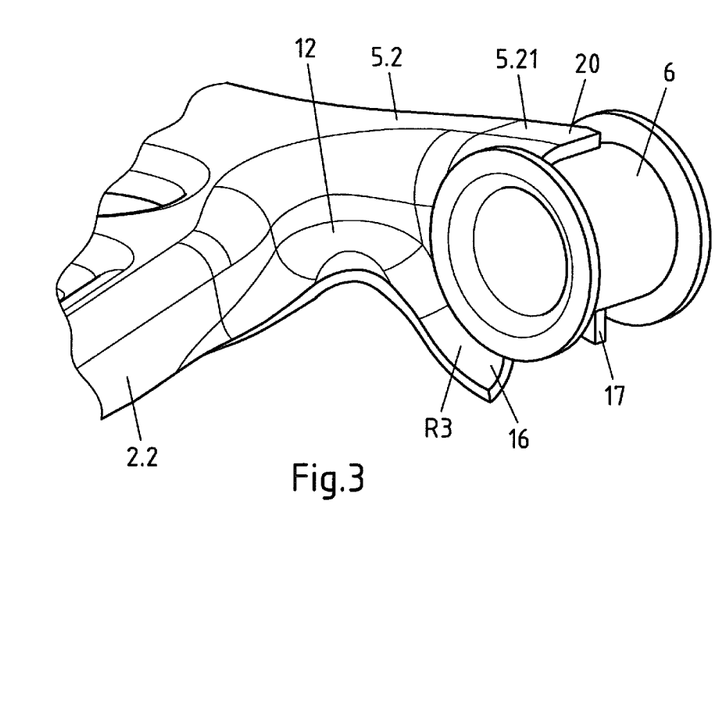
Figure 4:
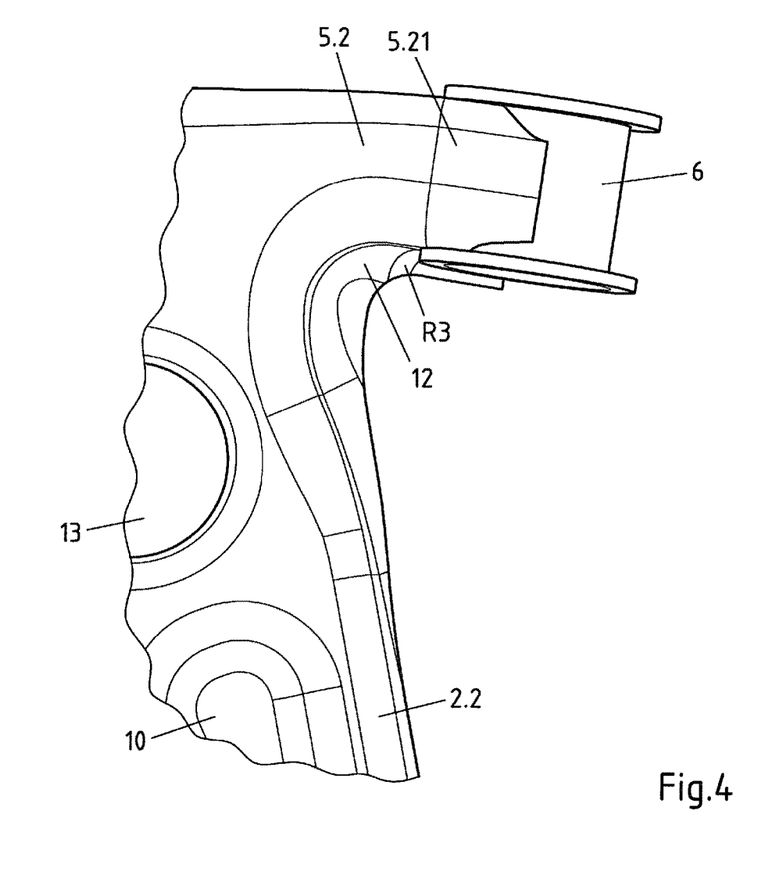
FIG. 4 is a slightly enlarged plan view of a portion of the chassis link of FIG. 1 comprising the bush.

It can be clearly seen from FIGS. 1 to 3 that the indentation 12, along which the main body 2 of the chassis link 1 is angled relative to the main-body plane 3, is produced having an edge region which, when viewed in cross section, has an outwardly curved edge end region 9.1 defining a radius R3. The edge end region 9.1 merges into the leg 16 of the U-shaped projection 5.21 which includes the recess 19 for receiving the bush 6 to be attached. The size of the radius R3 is for example in the range from 1.5 mm to 12 mm.

After the sheet metal blank has been pre-drawn and the box corner (indentation) 12 has been trimmed, the cylindrical bush 6 is inserted into the recesses 18, 19 of the legs 16, 17 and welded thereto. Preferably, the central web 20 of the U-shaped cross-sectional profile is also welded to the outer surface of the bush 6.

A bearing pin (not shown) is mounted on the wheel-side bearing region 5.1 and is typically formed as a ball joint. The bearing pin (ball joint) is pivotally held in a housing (not shown). The housing includes a shell-shaped hollow chamber, in which the ball head of the bearing pin is received. The housing is provided with a discoid fastening part (not shown), which is for example welded on. The discoid fastening part of the ball joint housing is screwed to the fastening holes 5.11 in the wheel-side bearing region 5.1 by means of three screws.

The bearing region 5.3 formed as a bearing eyelet is used for receiving a rubber member 7 which encloses a bearing bush (flange sleeve) 7.1 in an interlocking and integral manner. The bearing eyelet 5.3 comprises a peripheral collar (passage) 5.31.

The concave edge region 4 of the main body 2 extends from the wheel-side bearing region 5.1 up to a bodywork-side or crossmember-side bearing region 5.3 and is at an angle relative to the main-body plane 3. The edge regions 8, 9, opposite the concave edge region 4, of the arms 2.1, 2.2 are also at an angle, and more specifically in approximately or almost the same direction as the concave edge region 4 so that the arms 2.1, 2.2 have a substantially U-shaped or W-shaped cross-sectional profile. At each bearing region 5.1, 5.2, 5.3, the main body 2 has an open cross-sectional shape.

Beads or recesses 10, 11 are moulded into the main-body plane 3. In addition, through-holes, for example an opening 13 including a peripheral collar (passage) 13.1, can be provided in the main-body plane 3 and/or in at least one of the recesses 10, 11. In this case, the collar 13.1, 5.31 projects from the side of the main body 2 from which the angled edge regions 4, 8, 9 also protrude.

The concave edge region 4 of the main body 2 preferably has an oblique surface (chamfer) 14 which, when viewed in cross section, encloses an angle α in the range of from 25° to 75° with the surface 15 adjacent thereto (cf. FIG. 2). When viewed in cross section, the surfaces 14, 15 each include a substantially straight length or depth portion. The oblique surface 14 is delimited by two radii or round edges R1, R2.

The chamfer 14 extends at least along one curve length portion of the angled, concave edge region 4, said curve length portion being at least 10%, preferably at least 20%, of the curve length of the concave edge region 4.

Figures 5, 6:
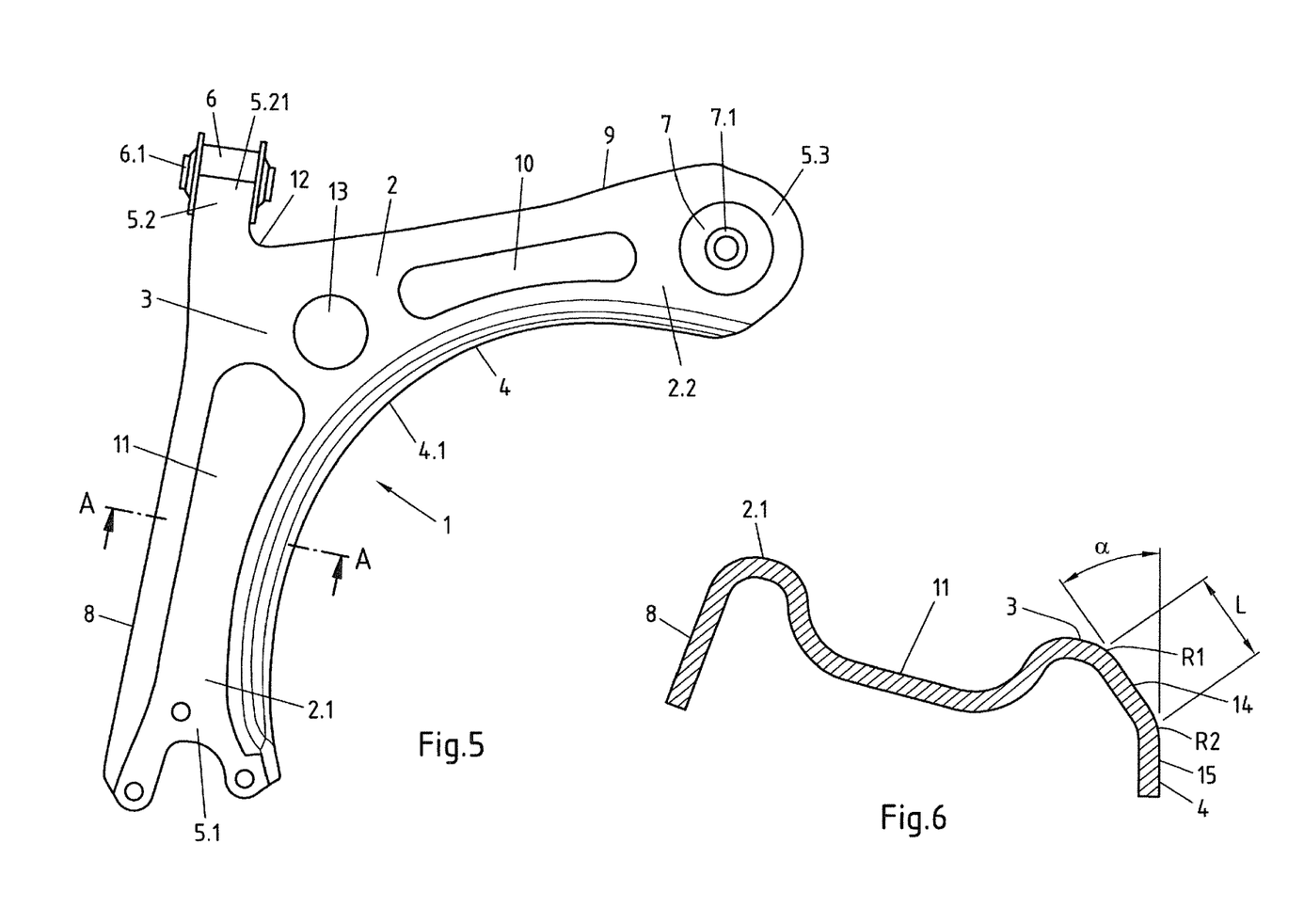
FIG. 5 is a slightly simplified plan view of the chassis link of FIG. 1 having rubber bearings mounted thereon.
FIG. 6 is an enlarged cross-sectional view of an arm of the chassis link along the sectional line A-A in FIG. 5.

In the embodiment shown in FIGS. 1, 5 and 6, the oblique surface (chamfer) 14 extends over almost the entire curve length of the angled, concave edge region 4. It is only at the end of the arm 2.1, on which the bearing region 5.1 is formed, that the angled, concave edge region 4 of the main body 2 has a curve length portion having no chamfer 14 (see FIGS. 1 and 5).

The angle α enclosed by the oblique surface 14 and the surface 15 adjacent thereto is designed to be substantially constant along the curve length portion or the angled, concave edge region 4. The angle α is for example approximately 35° (cf. FIG. 6). The length (depth) L of the oblique surface 14 is also designed to be substantially constant along the curve length portion of the concave edge region 4. At the sectional line A-A in FIG. 5, the length (depth) L is for example approximately 15 mm (cf. FIG. 6).

Figure 7:
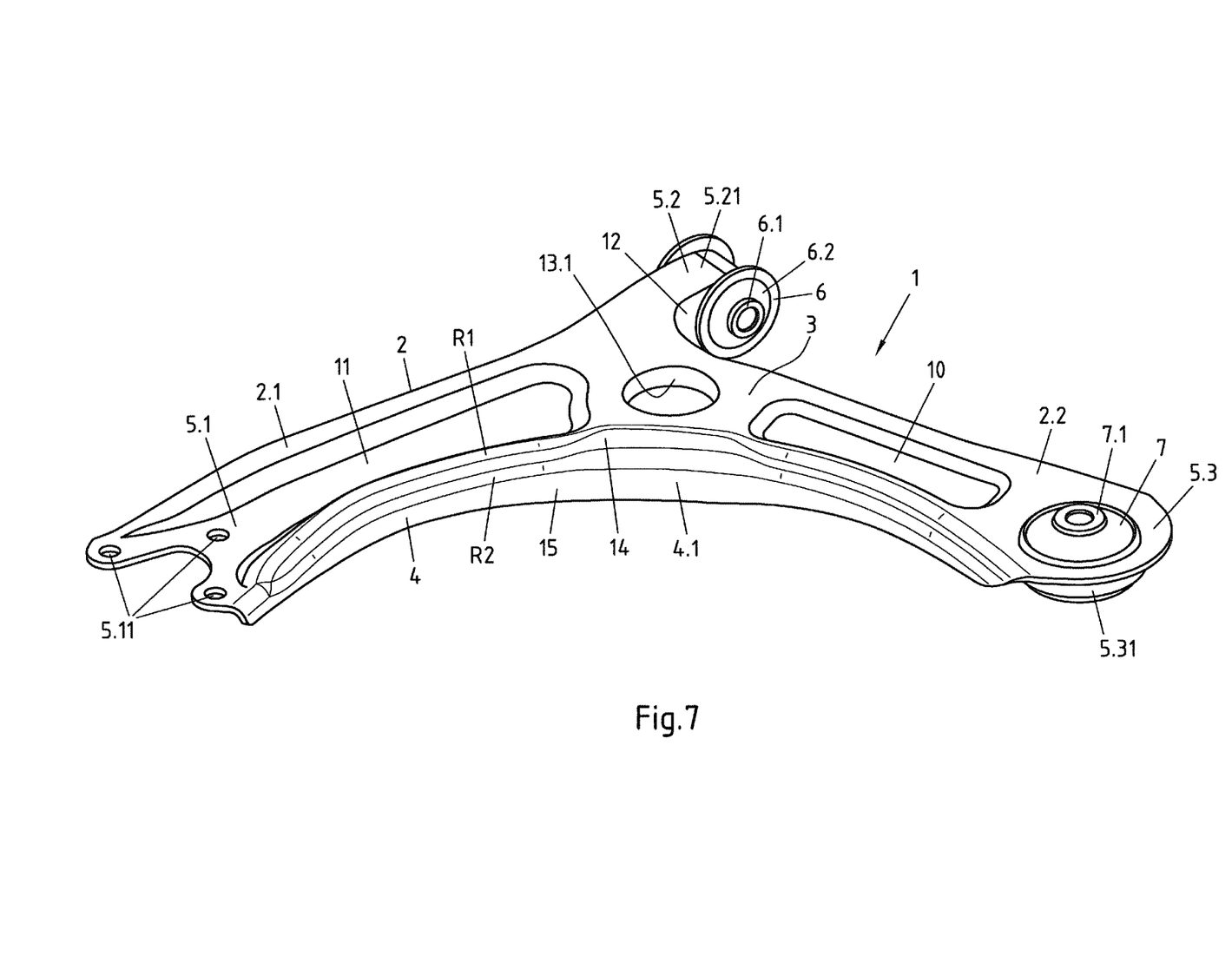
FIG. 7 is a perspective view of a second embodiment of a single-shell chassis link moulded from sheet metal.

The embodiment shown in FIG. 7 of the chassis link 1 according to the invention differs from that shown in FIGS. 1 and 5 in that the angle α enclosed by the oblique surface 14 and the surface 15 adjacent thereto varies along the curve length portion or angled, concave edge region 4. At the central portion of the arm 2.1, the angle α is for example approximately 35°. By contrast, in the central region 4.1 of the curve length of the angled, concave edge region 4, for example where the arms 2.1, 2.2 merge into one another or where the edge region 4 is closest to the through-opening 13, the angle α is significantly greater, for example in the range of from 45° to 60°. The angle α becomes smaller, starting from the central region 4.1, towards the end of the sheet metal arm 2.2 on which the bearing region 5.3 is formed, said angle having a value for example in the range of from 30° to 40° at the end of the arm or near the end of the arm 2.2.

It can also be seen in FIG. 7 that the length (depth) L of the oblique surface 14 varies along the curve length portion or angled, concave edge region 4. When viewed in the cross section of the respective arm 2.1, 2.2, the oblique surface 14 has a length L in the range of from 5 mm to 20 mm. At the central portion of the arm 2.1, the length (depth) L is for example approximately 15 mm. However, in the central region 4.1 of the curve length of the edge region 4, for example where the arms 2.1, 2.2 merge into one another or where the edge region 4 is closest to the through-opening 13, the length L of the oblique surface 14 is significantly greater, for example between 16 mm and 20 mm. The length (depth) L of the chamfer 14 becomes smaller, starting from the central region 4.1, towards the bearing eyelet 5.3, said length having a value for example of between 5 mm and 15 mm at the end of the arm or near the end of the arm 2.2.

In the chassis link 1 shown in FIG. 7, the angle α and the length (depth) L of the oblique surface (chamfer) 14 of the angled, concave edge region 4 is thus significantly greater in the central region 4.1 of the link 1 than at the free ends of its arms 2.1, 2.2.

Figure 8:
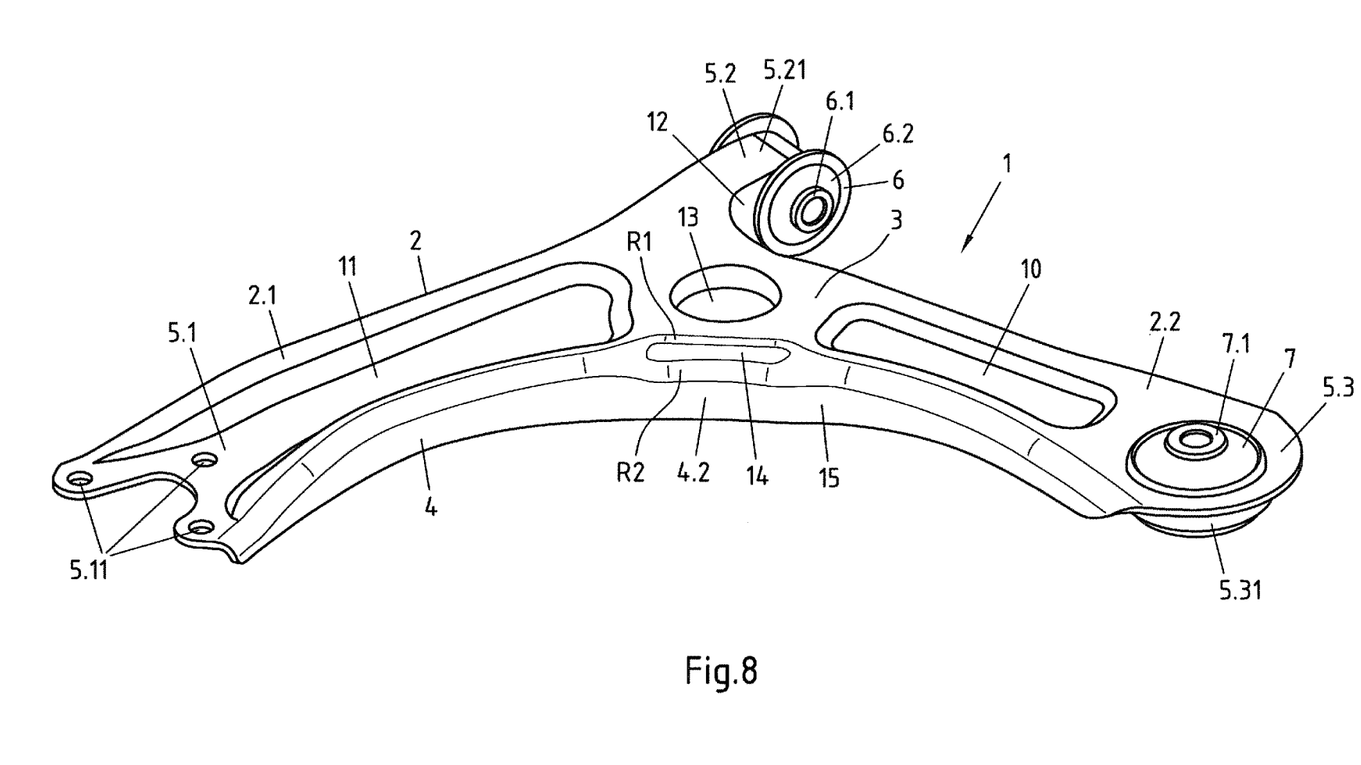
FIG. 8 is a perspective view of a third embodiment of a single-shell chassis link moulded from sheet metal.

The embodiment shown in FIG. 8 of the chassis link 1 according to the invention differs from that shown in FIGS. 1 and 5 in that the oblique surface (chamfer) 14 extends over a significantly shorter partial length of the curve length of the angled, concave edge region 4 than in the chassis link shown in FIGS. 1 and 5. In this case, the chamfer 14 extends substantially along a curve length portion 4.2 that is close to the opening 13 or between the mutually facing ends of the recesses 10, 11 in the main body 2. The arms 2.1, 2.2 of the transverse control arm 1 merge into one another in this curve length portion 4.2. In the embodiment according to FIG. 8, the angle α and the length (depth) L of the oblique surface 14 hardly vary or vary only slightly over the course of the surface 14.

Figure 9:
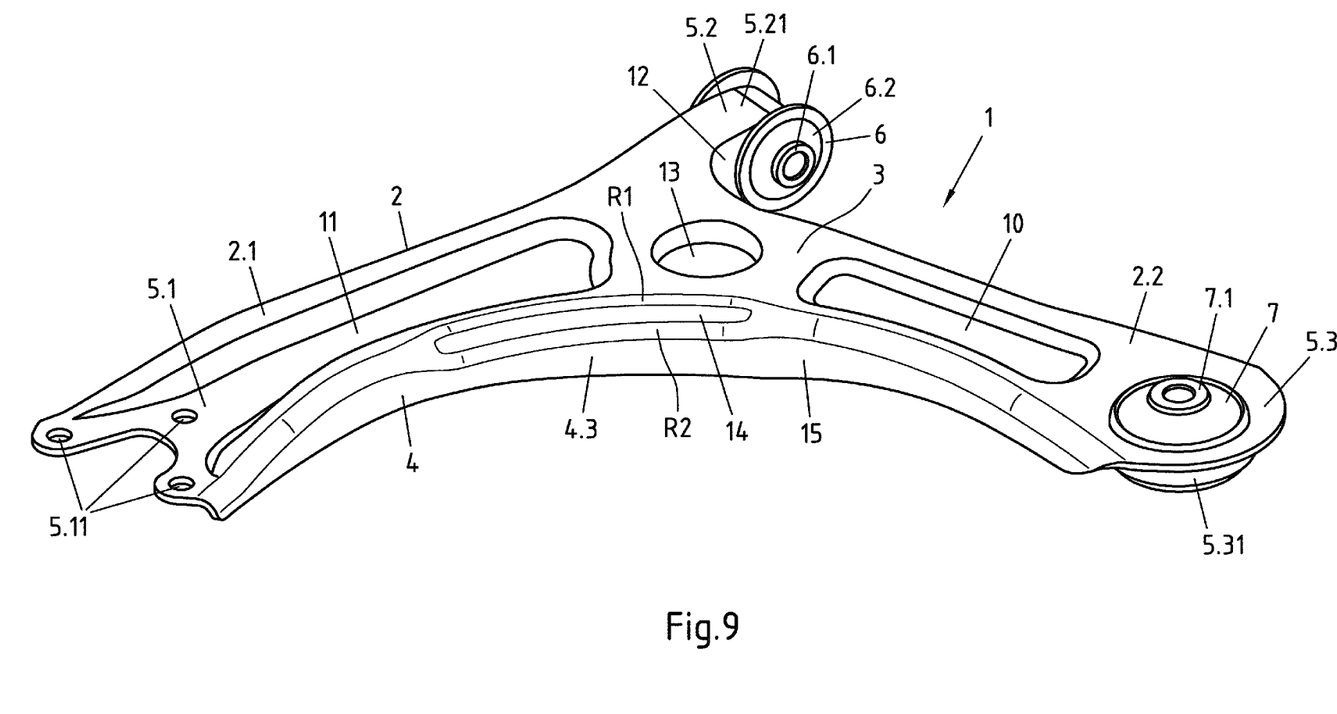
FIG. 9 is a perspective view of a fourth embodiment of a single-shell chassis link moulded from sheet metal.

The embodiment shown in FIG. 9 of the chassis link according to the invention also differs from that shown in FIGS. 1 and 5 in that the oblique surface 14 extends over a significantly shorter partial length of the curve length of the angled, concave edge region 4 than in the chassis link according to FIGS. 1 and 5. In this case, the chamfer 14 extends substantially along a curve length portion 4.3 that is close to the opening 13 (or the centre of the link) and next to a longitudinal portion of the recess 11 in the arm 2.1. In the chassis link 1 according to FIG. 9, the angle α and the length (depth) L of the oblique surface 14 hardly vary or vary only slightly over the course of the surface 14.

The invention is not limited to the embodiments shown in the drawings, but rather further variants are conceivable which also make use of the invention as set out in the appended claims, even if the design thereof differs from these embodiments. For example, the projection can also be formed, as a result of the pre-drawing of the sheet metal blank, so as to be angled relative to the main-body plane 3, a bearing eyelet for receiving the bush 6 being produced beforehand or subsequently in a portion of the sheet metal blank that forms a part of the projection in the finished chassis link. In this case, the bush 6 is pressed into the bearing eyelet and/or welded to the bearing eyelet once received therein.

In addition, the chassis link 1 can also include two or more successive oblique surfaces (chamfers) 14 along a curve length portion of the angled, concave edge region 4 which, when viewed in cross section, each enclose an angle in the range of from 25° to 75° with a surface 15, adjacent thereto, of the angled, concave edge region 4.

The invention claimed is:

1. A method for producing a chassis link, comprising the steps of:
shaping a single-shell main body from a sheet metal blank, thereby forming bearing regions on the main body for attaching bearing elements by which the main body is connected to a bodywork part or a crossmember and to a movable part of a wheel suspension of a motor vehicle, the bearing regions comprising a wheel-side bearing region and two bodywork-side or crossmember-side bearing regions, the main body comprising two arms which merge into one another and define a main-body plane and a concave edge region of the main body, the concave edge region extending from the wheel-side bearing region up to a first of the two bodywork-side or crossmember-side bearing regions and being angled relative to the main-body plane, the second bodywork-side or crossmember-side bearing region is formed as a projection and provided with a bush, and the projection and the arm, which comprises the first bodywork-side or crossmember-side bearing region, define an indentation, along which the main body is angled relative to the main-body plane; and
deforming the sheet metal blank by deep drawing, wherein the deep drawing includes pre-drawing during which the indentation is produced and in which the indentation is trimmed and the bush is attached to the projection once the indentation has been trimmed,
wherein the sheet metal blank is pre-drawn such that the indentation is given a radius that matches the bush to be attached such that there is no further need for a further forming operation in the indentation once the indentation has been trimmed,
wherein the indentation is trimmed by a cutting tool which acts on the pre-drawn sheet metal blank so as to cut from above, and
wherein an edge portion to be cut off from the indentation is lower than the main-body plane.

2. The method according to claim 1, wherein the projection is formed, as a result of the pre-drawing of the sheet metal blank, so as to have a substantially U-shaped cross-sectional profile.

3. The method according to claim 2, wherein both legs of the U-shaped cross-sectional profile are welded to the bush.

4. The method according to claim 1, wherein the projection is formed, as a result of the pre-drawing of the sheet metal blank, so as to be angled relative to the main-body plane, and wherein a bearing eyelet for receiving the bush being is produced beforehand or subsequently in a portion of the sheet metal blank that forms part of the projection in the chassis link.

5. The method according to claim 4, wherein the bush is pressed into the bearing eyelet.

6. The method according to claim 4, wherein the bush is welded to the bearing eyelet once received therein.

7. The method according to claim 1, wherein the sheet metal blank is shaped during deep drawing such that the angled, concave edge region comprises, along at least one curve length portion, at least one oblique surface which, when viewed in cross section, encloses an angle in the range of from 25° to 75° with a surface, adjacent thereto, of the angled, concave edge region.

8. The method according to claim 7, wherein the sheet metal blank is shaped during deep drawing such that the angle enclosed by the oblique surface and the surface, adjacent thereto, of the angled, concave edge region varies along the curve length portion, the variation being at least 5°.

9. The method according to claim 7, wherein the sheet metal blank is shaped during deep drawing such that the oblique surface, when viewed in cross section, has a length in the range of 5 mm to 20 mm.

10. The method according to claim 7, wherein the sheet metal blank is shaped during deep drawing such that a length of the oblique surface varies along the curve length portion, the variation being at least 1 mm.

11. The method according to claim 7, wherein the sheet metal blank is shaped during deep drawing such that the curve length portion having the oblique surface crosses a region of the main body in which the two arms merge into one another.

12. The method according to claim 1, wherein the sheet metal blank has a thickness in the range of 2 mm to 6 mm and a tensile strength in the range of 350 MPa to 1200 MPa.

13. The method according to claim 1, wherein the sheet metal blank is comprised of one of the following: dual-phase steel, complex phase steel and thermomechanically rolled, cold-formed steel.

14. The method according to claim 7, wherein the sheet metal blank is shaped during deep drawing such that the angle enclosed by the oblique surface and the surface, adjacent thereto, of the angled, concave edge region varies along the curve length portion, the variation being at least 10°.

15. The method according to claim 7, wherein the sheet metal blank is shaped during deep drawing such that a length of the oblique surface varies along the curve length portion, the variation being at least 2 mm.

\* \* \* \* \*